Aug. 22, 1950  W. H. BUELOW  2,519,346
AUTOMATIC CONTROL MECHANISM FOR CONCRETE MIXERS
Filed Oct. 5, 1948  5 Sheets-Sheet 1
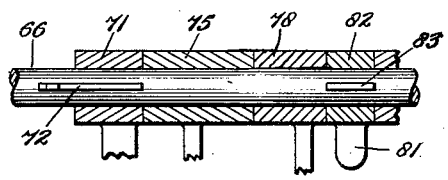
Fig. 11.
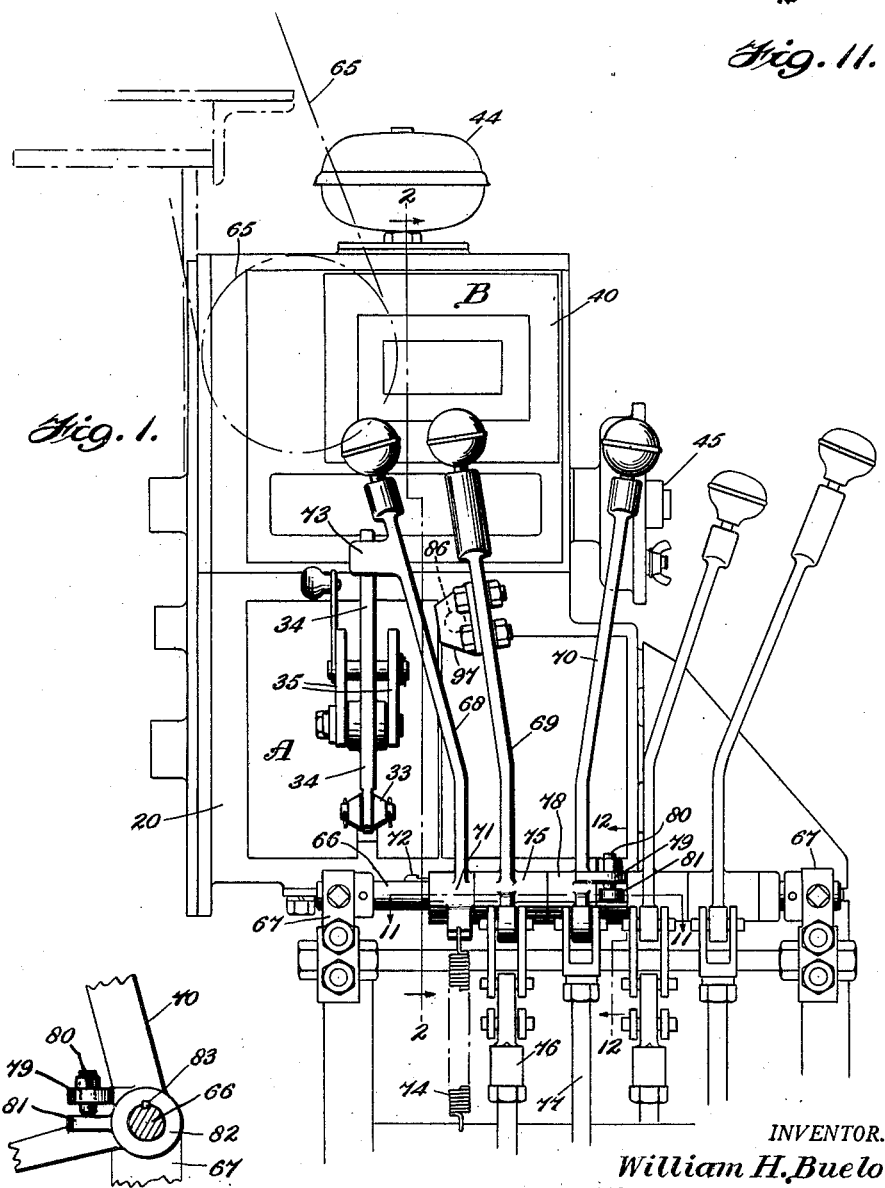
Fig. 1.
Fig. 12.
INVENTOR.
William H. Buelow,
BY
B. B. Collins
ATTORNEY Aug. 22, 1950 W. H. BUELOW 2,519,346
AUTOMATIC CONTROL MECHANISM FOR CONCRETE MIXERS
Filed Oct. 5, 1948 5 Sheets-Sheet 2

INVENTOR.
William H. Buelow,
BY
B. B. Collings
ATTORNEY

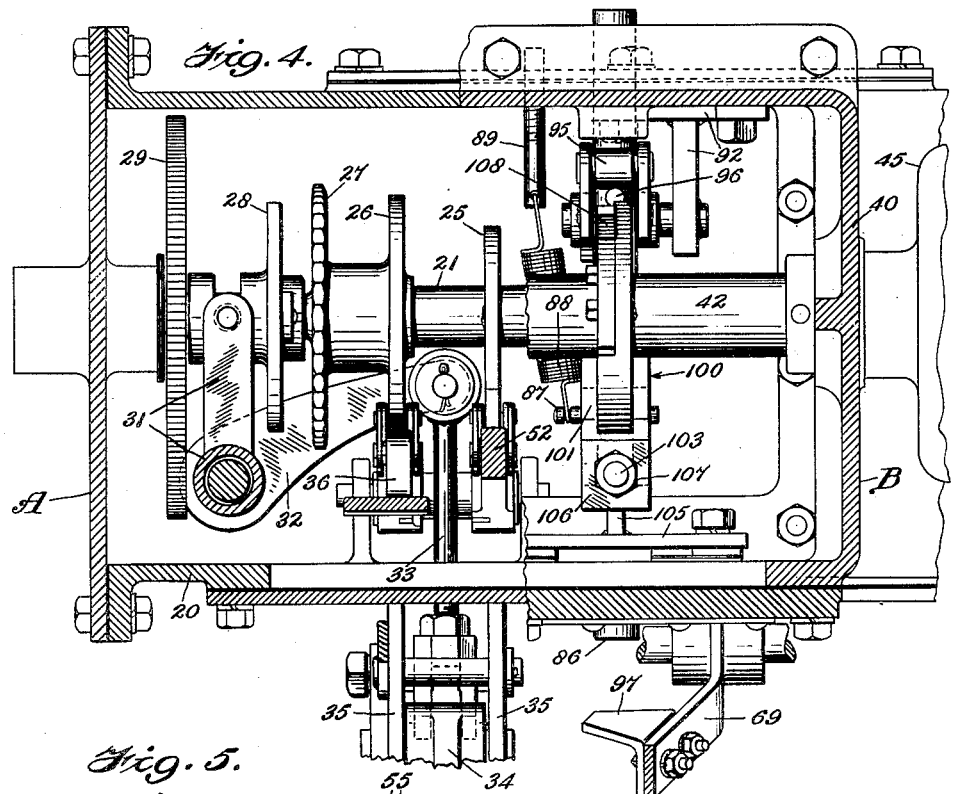
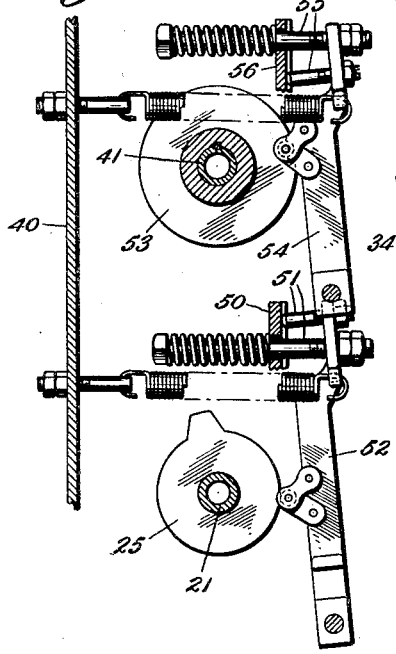
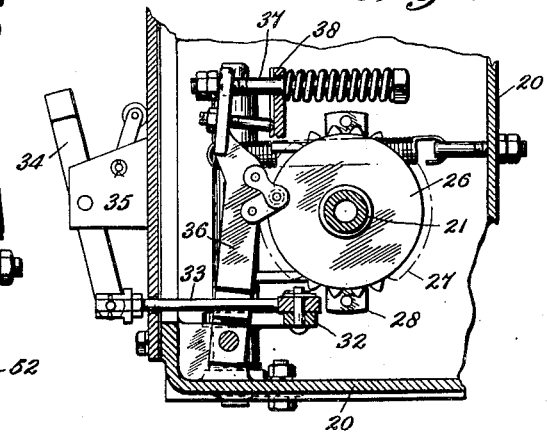

Aug. 22, 1950     W. H. BUELOW     2,519,346
AUTOMATIC CONTROL MECHANISM FOR CONCRETE MIXERS
Filed Oct. 5, 1948     5 Sheets-Sheet 5
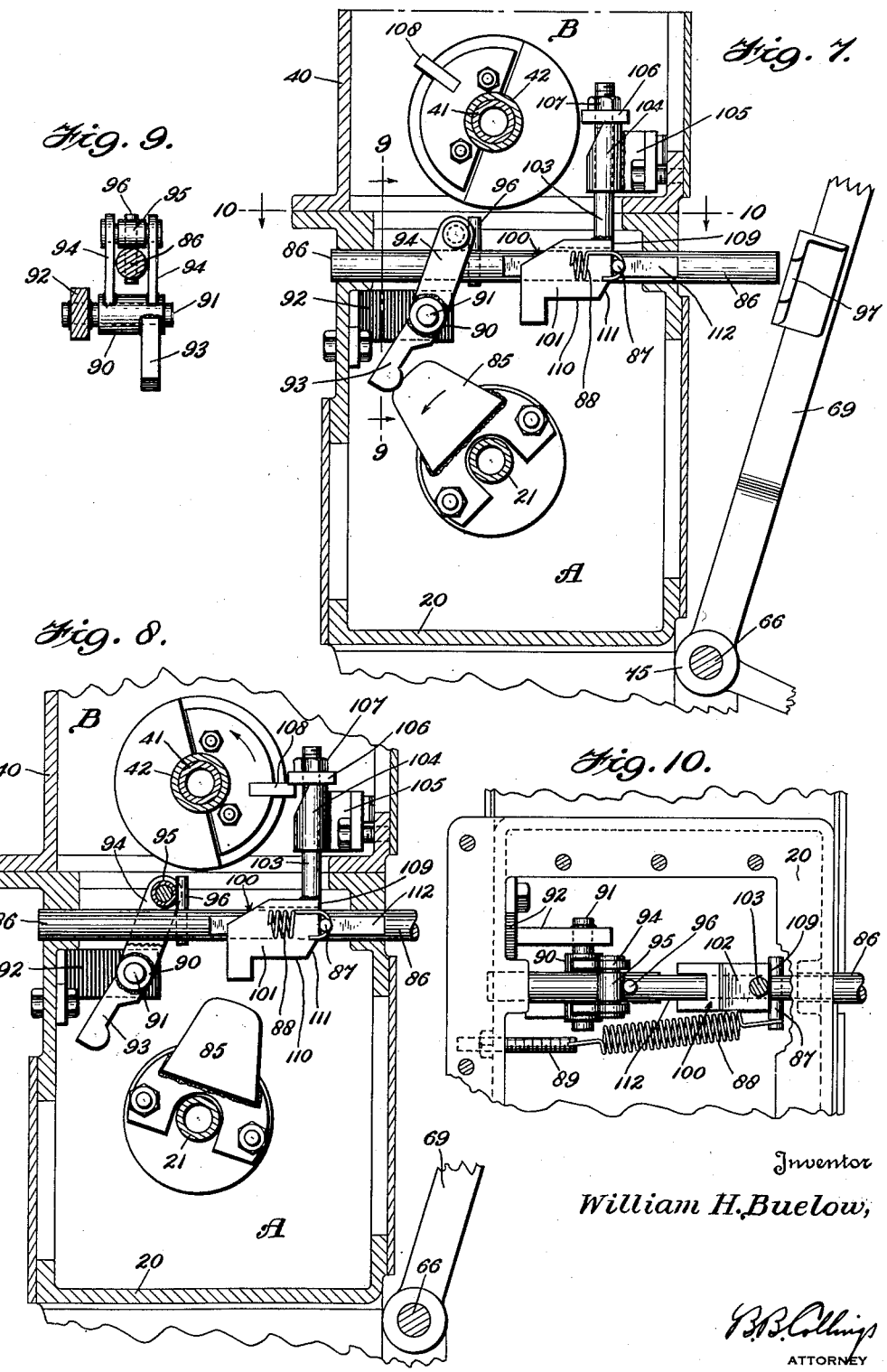
Inventor
William H. Buelow,
ATTORNEY Patented Aug. 22, 1950

2,519,346

UNITED STATES PATENT OFFICE 2,519,346

AUTOMATIC CONTROL MECHANISM FOR CONCRETE MIXERS

William H. Buelow, Milwaukee, Wis., assignor to Chain Belt Company, Milwaukee, Wis., a corporation of Wisconsin Application October 5, 1948, Serial No. 52,934

7 Claims. (Cl. 259—163)

The invention relates to apparatus for controlling the functioning of a plurality of instrumentalities of a batch concrete mixer in repetitive cycles, and more especially to a power driven control mechanism wherein a plurality of cams act to automatically initiate and/or terminate the operations of certain of the mixer instrumentalities in properly timed sequence. This relieves the operator from the necessity of performing several manual operations, enabling him to better devote his attention to other functions of the machine wherein manual control is necessary or highly desirable, and by eliminating the time lag which is almost unavoidably present in the manual control of several successively occurring functions, to speed up the entire operation and materially increase the output of the machine.

Several forms of such control devices have been heretofore developed, principally for use in connection with concrete mixers of the type commonly known as "pavers," wherein the device usually controls the movements of at least (1) the skip by means of which successive batches of aggregates and cement are elevated and charged into the mixing drum; (2) the valve or valves controlling the admission of water for the batch into the drum; and (3) the chute or other means which effects the discharge of the mixed batch from the drum. In the case of two-compartment mixers, the device may also control the mechanism which effects transfer of the partially mixed batch from one compartment of the drum to the other; and in many cases the control device also initiates operation of a timing mechanism or "batchmeter," which measures the duration of the mixing period and gives a signal indicating the termination thereof.

While in the normal functioning of a mixer equipped with such a control mechanism the device automatically initiates and/or terminates the oerations of the several controlled instrumentalities in properly timed sequence, it nevertheless is desirable that if necessary the operator be able to take over manual control of any of the instrumentalities at any time, and thus it is common for the control devices to be so constituted that this may be done, usually through the medium of a manually operable lever for each of the instrumentalities. It is also desirable that each cycle of the control device be initiated at the volition of the operator, for which purpose the device ordinarily is provided with a manually operable starting lever.

Concrete specifications usually include rigorously enforced provisions regarding the minimum time for which each batch of materials must be mixed, and therefore the batchmeter normally is constructed or adjusted to time and indicate such minimum period. However, with a manually operable control being provided for the discharging instrumentality, it is possible that through the use thereof an operator might effect discharge of the batches prior to the expiration of said minimum mixing period, unless some means be provided to render the manual discharge control ineffective during said period.

In co-pending application Serial No. 750,544 filed May 26, 1947, by applicant's associates Andrew McMillan et al., there is disclosed and claimed a combined automatic control and mix timing device for a two-compartment concrete mixer, wherein a cycle of the control mechanism is manually initiated by the operator after the conclusion of each mixing period. Since it is not always feasible to discharge a completed batch from the drum immediately upon conclusion of the mixing period, in the mechanism disclosed in said patent application movement of the discharge chute to discharging position in the drum is not effected automatically by the control device but instead is secured through manipulation of the manually operable discharge chute lever by the operator before or concurrently with manipulation of the lever which sets the control device into a cycle of operation. In this particular instance each cycle of the control mechanism automatically effects, in properly timed relation, the withdrawal of the discharge chute from the drum; the opening and closing of the transfer door between the two drum compartments; the elevation of the charging skip; the opening and closing of the water control valves; and initiation of a cycle of the mechanism for timing the mixing period. Additionally, as a safety measure, the device of the said patent application includes mechanism whereby, unless prevented by an intentional manual act of the operator, the control cycle will be automatically interrupted previous to elevation of the charging skip, and if so interrupted it requires an intentional manual act of the operator to again set the control device into operation and pick up the cycle at the point at which it was interrupted.

The mechanism of the present invention is of the same general type as that of said earlier patent application, although the form shown in the accompanying drawings is intended for use with a single compartment mixer and thus omits the controls for the transfer mechanism between compartments. However, as will be readily understood, the present mechanism may be easily adapted for use with two-compartment machines by the mere addition of such controls as disclosed in the prior case.

While the McMillan et al. apparatus included means for preventing manual actuation of the discharge chute lever during the mixing period, the present device incorporates a different and improved form thereof, which constitutes a salient feature of this invention. Also, whereas in the former case the elevation of the charging skip was controlled by a cam on the control cycle shaft, in the present instance elevation of the skip is automatically initiated through interconnections between the manual skip control lever and the starting lever of the automatic control device, said connections being such as to permit of free manual operation of the skip control lever at other times, as may be necessary or desirable.

In the accompanying drawings forming a part of this specification, in which like reference characters designate like parts in all the views:

Figure 1 is a front elevational view of the essential parts of an automatic control and mix timing device constructed in accordance with the present invention;

Fig. 4 is a horizontal sectional view on approximately the planes indicated by the line 4—4 in Fig. 3, looking down;

Figure 2:
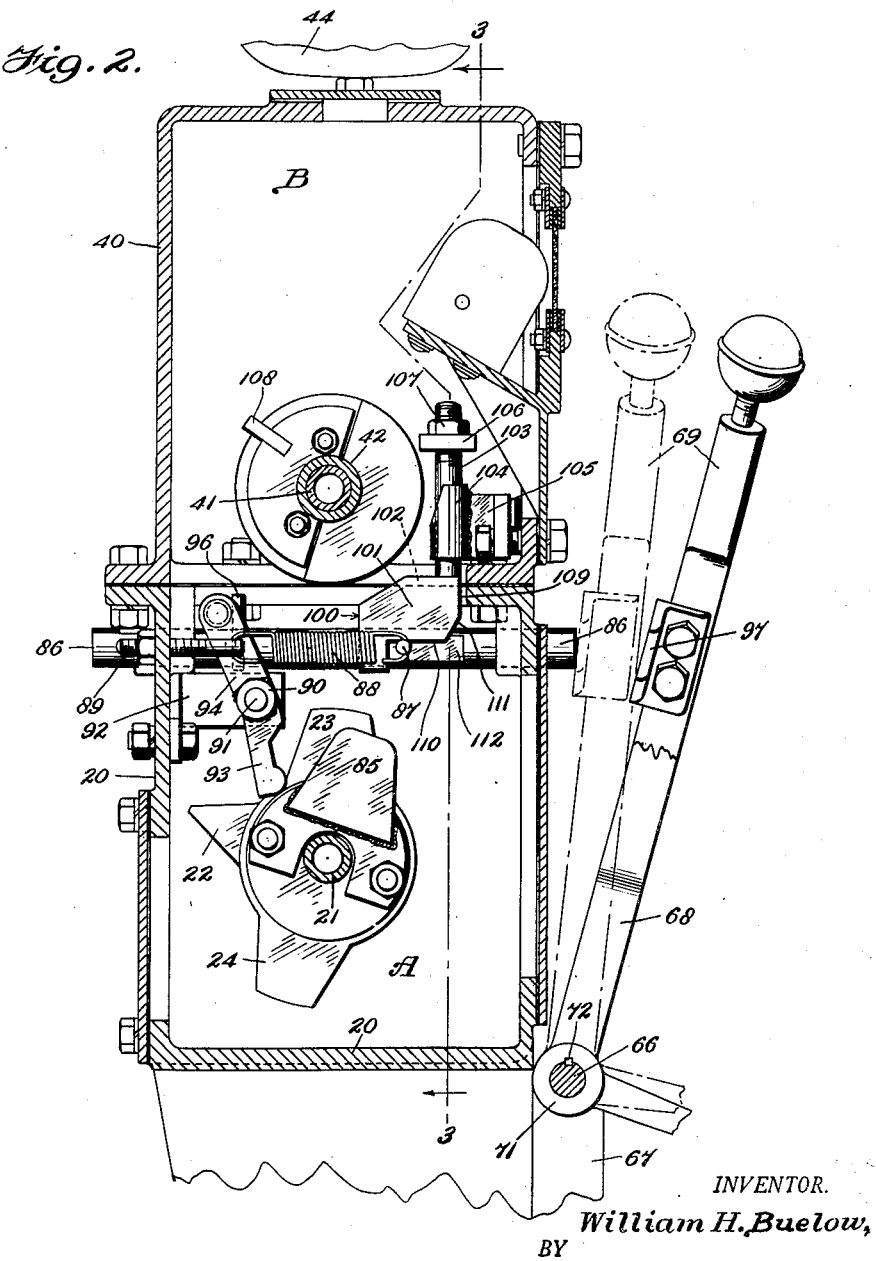
Fig. 2 is a vertical sectional-elevational view on approximately the planes indicated by the line 2—2 in Figs. 1 and 3, looking in the direction of the arrows.
Figure 3:
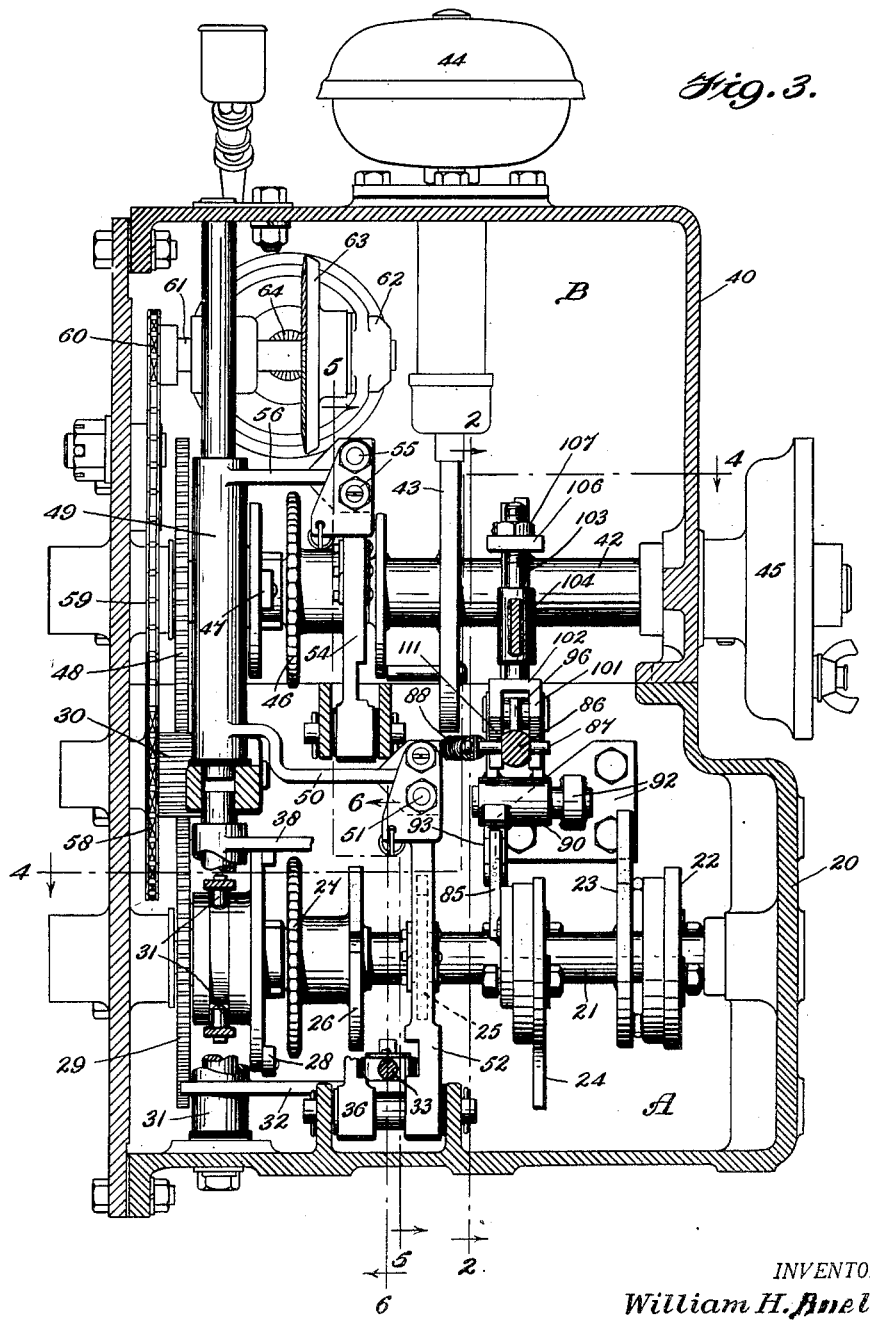
Fig. 3 is a vertical sectional-elevational view at right angles to Fig. 2, on approximately the plane indicated by the line 3—3 in Fig. 2, looking in the direction of the arrows.

Figs. 5 and 6 are fragmentary detail sectional views on approximately the planes indicated by the lines 5—5 and 6—6 respectively in Fig. 3, looking in the directions of the arrows;

Figs. 7 and 8 are fragmentary sectional views similar to Fig. 2, illustrating different positions assumed by the mechanism for preventing actuation of the discharge chute lever during a mixing period;

Fig. 9 is a detail sectional-elevational view on the plane indicated by the line 9—9 of Fig. 7, looking toward the right;

Fig. 10 is a fragmentary sectional-plan view on the plane indicated by the line 10—10 in Fig. 7, looking down; and Figs. 11 and 12 are detail sectional views on the planes indicated by the lines 11—11 and 12—12 respectively in Fig. 1.

Referring to the said drawings in detail, the present apparatus comprises a cycle control unit A and a mixing period timing unit B superposed thereon. The unit A comprises a housing 20 in which is journalled a horizontally disposed cycle control shaft 21 which carries a plurality of cams arranged to actuate in properly timed sequence, mechanisms for initiating and/or terminating operations of such of the mixer instrumentalities as it is desired to control automatically. In the illustrative example here shown for a single compartment mixer, there is a cam 22 which effects opening of the valve which admits water to the mixing compartment; a cam 23 which effects closing of said valve; a cam 24 which effects movement of the discharge chute to non-discharging position; and a cam 25 which initiates a cycle of the batchmeter or mix timing unit B. These cams all have counterparts in the aforesaid McMillan et al. patent application, and of course the shaft may be provided with additional cams as disclosed therein if the mechanism is to be used on a two-compartment machine. The mechanisms actuated by the cams may be substantially the same as those of the McMillan et al. device, and are not here shown as they are not essential to an understanding of the present invention.

The shaft 21 also carries a detent disk 26 and a clutch member 27, which latter is adapted to be driven by a shiftable clutch member 28, driven by a gear 29 meshing with a pinion 30. The clutch element 28 is movable into engagement with its companion member 27, to start a cycle of the shaft 21, by means of a shifting fork structure 31 operable through the medium of an arm 32 and link 33 by a starting lever 34 pivotally mounted by ears 35 on the front of housing 20. The detent disk 26 co-operates with a detent lever 36 (Figs. 4 and 6) to prevent movement of shaft 21 between cycles, and there are connections 37 between this lever and an arm 38 of the shifting fork structure 31 which provide for automatic disengagement of the clutch at the conclusion of a cycle, as in the McMillan et al. device.

The mixing period timing unit B comprises a casing 40 surmounting the housing 20 of unit A and journalling a timing shaft 41 in vertically spaced parallel relation to shaft 21. A sleeve 42 surrounds shaft 41 and carries a cam 43 for actuating a bell 44 or other appropriate signal to indicate the conclusion of a mixing period. The sleeve is adjustably connected to the shaft by mechanism 45 similar to that disclosed in the McMillan et al. patent application, whereby the length of the period timed by the unit may be varied as circumstances may require. The shaft 41 carries a driven clutch element 46 engageable by a driving clutch element 47 which is driven by a gear 48 meshing with pinion 30 (Fig. 3). The clutch element 47 is shiftable by a fork structure 49, which includes an arm 50 having connections 51 with a starting lever 52 operable by the cam 25 on control cycle shaft 21 (Figs. 3 and 5) to automatically engage the clutch. The mix timing shaft 41 also has a detent mechanism similar to that on shaft 21 and comprising a detent disk 53 and a detent lever 54 cooperating therewith and having connections 55 with an arm 56 carried by the fork structure 49. This mechanism effects automatic disengagement of the clutch at the end of each mixing period and holds shaft 41 against rotation between cycles thereof.

The pinion 30 which supplies power to shafts 21 and 41 is driven by a chain and sprocket drive 58, 59, 60, the sprocket 60 of which is carried by a shaft 61 journalled in a bearing structure 62 carried by the housing 40 of unit B. The said shaft carries a bevel gear 63 which meshes with a bevel pinion 64, the shaft of which extends to the exterior of casing 40 where it is driven, directly or indirectly, from the mixer power plant, as by a chain and sprocket drive diagrammatically indicated at 65 in Fig. 1.

A rock-shaft 66 is mounted along the lower front of unit A, being journalled in bearings 67 carried by the housing 20 thereof. The said shaft mounts a plurality of hand levers by means of which the operator may take manual control of each of the various mixer instrumentalities subject to automatic control by unit A. In the embodiment of the invention here illustrated, five such levers are shown, of which however, only three, designated 68, 69 and 70, are important as regards an understanding of the invention.

The hub 71 of lever 68 is keyed to shaft 66, as indicated at 72, and the upper portion of the lever is provided with an ear 73 which extends in front of the upper portion of starting lever 34 of unit A so that when hand lever 68 is pushed in the said ear will engage with and rock the starting lever 34 whereby to initiate a cycle of control shaft 21 as above described. The lever 68 is retracted by a spring 74 (Fig. 1).

The hand lever 69 controls movements of the discharge chute, and its hub 75 is loosely mounted on shaft 66 adjacent the hub 71 of lever 68. The said lever 69 is connected through linkage 76 to mechanism for effecting movements of the discharge chute both to and from discharging position, and the said linkage is also connected to devices actuated by cam 24 on control shaft 21 whereby the movements of the chute to non-discharge position may be automatically effected as a function of the control cycle. Movements of the chute to discharge position may be effected only through a pushing in of lever 69 by the operator.

The lever 70 controls the skip elevating mechanism through linkage 77, and its hub 78 is loosely mounted on shaft 66 adjacent the hub 75 of the discharge chute lever. The hub 78 of lever 70 is provided with an offset ear 79 carrying an adjustable set screw 80 which is adapted to engage an ear 81 extending from a collar 82 which is keyed as at 83 to shaft 66 next adjacent hub 78, see Figs. 1, 11 and 12. By this construction, when lever 68 is pushed in to start a cycle of control shaft 21, it rocks shaft 66 which motion is transmitted through collar 82, ears 79 and 81, and set screw 80 to skip control lever 70 and its linkage 77, thereby starting elevation of the skip substantially simultaneously with the beginning of a cycle of the control shaft 21. The time required to elevate the skip is such that, assuming the discharge chute lever 69 is pushed in simultaneously with said movement of lever 68 whereby to start discharge approximately simultaneously with starting of the control cycle of shaft 21, discharge may be completed and cam 24 may function to start withdrawal of the discharge chute from the drum by the time the aggregates start into the drum from the skip.

With cycle control lever 68 retracted by its spring 74, skip control lever 70 may be pushed in independently thereof, whereby if necessary or desirable the operator may effect raising of the skip without starting a cycle of the automatic control mechanism.

As previously mentioned, the manual control over functioning of the discharge chute provided by lever 69 makes it possible that the operator might move the chute to discharge position before a batch is completely mixed, thereby defeating the principal function of the unit B in timing and indicating the expiration of a determined minimum mixing period. To obviate such possibility the following mechanism is provided to prevent manipulation of lever 69 whereby to enter the discharge chute into the drum during the mixing period.

As best shown in Figs. 2, 3, 4 and 7-10, a cam 85 is mounted on the control cycle shaft 21, and a horizontal rod 86 is slidably mounted in the upper portion of the housing 20 of unit A, extending through both the front and rear walls of said housing. The rod carries a projecting pin 87 to which is attached one end of a tension spring 88, the other end of which is secured to an adjustable anchor bolt 89 carried by the rear wall of housing 20. A lever 90 is pivotally mounted on a stud 91 carried by a bracket 92 secured to the rear wall of the housing, said lever comprising a depending arm 93 disposed in the path of cam 85, and a pair of spaced upwardly extending arms 94 which straddle the rod 86. A roller 95 is mounted between the upper ends of arms 94 and engages a vertical pin 96 carried by the rod.

In Fig. 2 the parts are shown in the positions they occupy between cycles of operation, during each of which cycles the shaft 21 makes one complete revolution in a counterclockwise direction, at the conclusion of which it is automatically stopped and held against rotation by the detent mechanism 26, 36 mentioned above. In the course of the cycle the cam 85 engages the arm 93 of lever 90 and swings the same to the position shown in Fig. 7, which movement, through the engagement of the roller 95 with pin 96, slides the rod 86 axially to project its forward end into proximity to an ear 97 carried by the discharge control lever 69, as will be clear from said figure. Obviously so long as the rod 86 is thus projected, the control lever 69 can not be moved inwardly to the broken line position shown in Fig. 2 to cause movement of the discharge chute to discharging position.

The shafts 21 and 41 rotate at equal speeds and for like periods of time but the cycle of the mix timing shaft 41 is staggered in point of time relative to that of the shaft 21, being initiated by cam 25 relatively late in the cycle of the latter shaft. Thus the cam 85 will have moved out of engagement with lever arm 93 and the shaft 21 will have come to rest before the cam 43 on mix timing shaft 41 actuates the signal 44 to indicate the end of the mixing period. To prevent the spring 88 from retracting rod 86 when cam 85 disengages lever arm 93, means are provided to retain the said rod in its projected position shown in Fig. 7 until approximately the time of actuation of signal 44 so as to continue the restraint imposed on discharge chute lever 69 by rod 86 throughout the mixing period.

These means comprise a detent member 100 of inverted U-shape in cross section the legs 101 of which straddle the rod 86 while its bridge portion 102 carries a vertical stem 103 which is slidably mounted in a barrel 104 of a bracket 105 carried by the housing 40 of unit B. A head 106 is threaded on the upper end of the stem 103 and may be locked in various positions thereon by a lock nut 107. A cam 108 is mounted on the sleeve 42 carried by the mix timing shaft 41, in position to engage with the under surface of head 106, as indicated in Fig. 8.

As above mentioned, the normal position of the parts of both units A and B, i. e., their positions of rest between cycles, is shown in Fig. 2. In this position the discharge chute lever 69 may be pushed in to the broken line position shown in said figure to cause movement of the chute to the discharging position, and usually more or less simultaneously therewith the lever 68 is also pushed in to start the shaft 21 into operation. Shortly after rotation of this shaft is begun its cam 85 engages lever arm 93 and moves lever 90 and rod 86 to the Fig. 7 positions, whereby to prevent lever 69 from being again pushed in. As the rod reaches this position the detent 100 drops by gravity action to its Fig. 7 position, with the forward faces 109 of its legs 101 engaging behind pin 87 to prevent rod 86 from being retracted when cam 85 disengages lever arm 93. The rod is thus retained in projected position while shaft 21 continues through its cycle and returns cam 85 to the position shown in Figs. 2 and 8.

At a predetermined point in the cycle of shaft 21 its cam 25 initiates operation of timing shaft 41 and when rotation of this shaft has continued for a determined period (which may be varied by adjustment of sleeve 42 on shaft 41 as in the prior McMillan et al. device) cam 108 engages head 106 of detent stem 103, as indiacted in Fig. 8, and raises the detent member 100 back to the Fig. 2 position. The spring 88 now moves the rod 86 back to retracted position, and discharge lever 69 may be again manipulated at will to effect discharge of the completed batch. Release of rod 86 from detent 100 may occur simultaneously with sounding of signal 44 by cam 43, but preferably takes place a second or two before it.

In the raised position of detent 100 shown in Fig. 2, the under faces 110 of its legs 101 rest upon the pin 87 which thus prevents the detent from dropping until the rod 86 is moved forwardly by cam 85. The lower portions of the forward faces 109 of the detent legs are preferably beveled, as indicated at 111, whereby as cam 108 starts to elevate the detent the pin 87 will first ride along such beveled portions and permit a slight retraction of the rod before it is entirely released. Thus, if toward the conclusion of a mixing period the operator pushes lever 69 inwardly to engage its ear 97 with the end of rod 86 he can feel the rod begin to retract as the pin 87 rides along the inclines 111 and be in a position to push the discharge chute lever home to start discharge promptly upon sounding of the signal 44.

The rod 86 is preferably provided with opposed flats 112 in the area of operation of the detent 100, which through engagement with the inner surfaces of legs 101 of the detent, prevent turning of the rod about its axis and maintain the pins 87 and 96 properly positioned.

What is claimed is:

1. In apparatus for controlling a plurality of instrumentalities of a batch concrete mixer, including that for effecting discharge of the mixed batches, the combination of cyclically operable mechanism for measuring a determined mixing period for the batches; cyclically operable mechanism for automatically controlling the functioning of said mixer instrumentalities in timed sequence; driving means for moving each of said mechanisms through its operative cycle; means for co-ordinating the operative cycles of the two mechanisms; manually operable means for controlling functioning of said discharge instrumentality independently of said automatic control mechanism; means actuated by said automatic control mechanism at the beginning of a mixing period to restrain operation of said manual control means; and means operable by said measuring mechanism at the conclusion of the mixing period to remove said restraint and restore manual control over the discharge instrumentality.

2. In apparatus for controlling a plurality of instrumentalities of a batch concrete mixer, including that for effecting discharge of the mixed batches, the combination of cyclically operable mechanism for measuring a determined mixing period for the batches; cyclically operable mechanism for automatically controlling the functioning of said mixer instrumentalities in timed sequence; driving means for moving each of said mechanisms through its operative cycle; means for co-ordinating the cycle of said mixing period measuring mechanism with that of the mechanism controlling functioning of the mixer instrumentalities; means including a manually operable lever mounted adjacent said automatic control mechanism for controlling functioning of said discharge instrumentality independently of such mechanism; a member movably mounted adjacent said automatic control mechanism and shiftable to and from a position in which to restrain operation of said manual lever; means actuated by the automatic control mechanism at the beginning of a mixing period to shift said member to said restraining position; and means operable by said measuring mechanism at the conclusion of the mixing period to return said member from its restraining position and thereby restore manual control over the discharge instrumentality.

3. In apparatus for controlling a plurality of instrumentalities of a batch concrete mixer, including that for effecting discharge of the mixed batches, the combination of cyclically operable mechanism for measuring a determined mixing period for the batches; cyclically operable mechanism for automatically controlling the functioning of said mixer instrumentalities in timed sequence; driving means for moving each of said mechanisms through its operative cycle; means operable by the mixer instrumentality control mechanism to co-ordinate the cycles of the two mechanisms; means including a manually operable lever mounted adjacent said automatic control mechanism for controlling functioning of said discharge instrumentality independently of such mechanism; a member movably mounted adjacent said automatic control mechanism and shiftable to and from a position in which to restrain operation of said manual lever; means comprising a cam in said automatic control mechanism, and a lever operable thereby, for shifting said member to its restraining position at the beginning of a mixing period; a cam in said measuring mechanism; and means actuated by said last named cam at the conclusion of the mixing period to return the member from its restraining position and thereby restore manual control over the discharge instrumentality.

4. In apparatus for controlling a plurality of instrumentalities of a batch concrete mixer, including that for effecting discharge of the mixed batches, the combination of cyclically operable mechanism for measuring a determined mixing period for the batches; cyclically operable mechanism for automatically controlling the functioning of said mixer instrumentalities in timed sequence; means for independently moving each of said mechanisms through its operative cycle; means operable by the mixer instrumentality control mechanism to co-ordinate the cycles of the two mechanisms; means including a manually operable lever mounted adjacent said automatic control mechanism for controlling functioning of said discharge instrumentality independently of such mechanism; a member movably mounted adjacent said automatic control mechanism and shiftable to and from a position in which to restrain operation of said manual lever; means actuated by the automatic control mechanism at the beginning of a mixing period to shift said member to said restraining position;

a detent engageable with said member to hold it in said position; and a cam in the measuring mechanism engageable with said detent at the conclusion of the mixing period to disengage it from the member, whereby to release the latter for movement from its restraining position.

5. In apparatus for controlling a plurality of instrumentalities of a batch concrete mixer, including that for effecting discharge of the mixed batches, the combination of cyclically operable mechanism for measuring a determined mixing period for the batches; cyclically operable mechanism for automatically controlling the functioning of said mixer instrumentalities in timed sequence; means for moving each of said mechanisms through its operative cycle; means operable by the mixer instrumentality control mechanism at a determined point in its cycle to initiate a cycle of the mixing period measuring mechanism; means including a manually operable lever mounted adjacent said automatic control mechanism for controlling functioning of said discharge instrumentality independently of such mechanism; a rod slidably mounted by said automatic control mechanism and provided with an abutment; means operable by the automatic control mechanism at the beginning of a mixing period to move said rod to a position in the path of said manual control lever to prevent actuation thereof; spring means biasing said rod from said position; a detent engageable with said abutment when the rod reaches said preventive position, to hold it therein; and a cam operable by the measuring mechanism to engage the detent and release it from the rod abutment at the conclusion of the mixing period, whereby the spring may retract the rod from its said preventive position.

6. In apparatus for controlling a plurality of instrumentalities of a batch concrete mixer, including that for effecting discharge of the mixed batches, the combination of cyclically operable mechanism for measuring determined mixing periods for the batches; cyclically operable mechanism for automatically controlling the functioning of said mixer instrumentalities in timed sequence; means for moving said mechanisms through their respective operative cycles; means operable by the mixer instrumentality control mechanism to initiate the cycles of the mixing period measuring mechanism; means including a manually operable lever mounted adjacent said automatic control mechanism for controlling functioning of said discharge instrumentality independently of such mechanism; a rod slidably mounted by said automatic control mechanism and provided with an abutment; means operable by the automatic control mechanism at the beginning of a mixing period to move said rod to a position in the path of said manual control lever whereby to prevent actuation thereof; a spring biasing said rod from said position; a detent engageable with said rod abutment when the rod reaches said preventive position, to hold it therein, said detent having a beveled portion engageable by the abutment to effect a slight retraction of the rod preliminary to complete release thereof from the detent; and a cam operable by the measuring mechanism to engage the detent and release it from the rod abutment at the conclusion of the mixing period, whereby the spring may completely retract the rod.

7. In apparatus for controlling a plurality of instrumentalities of a batch concrete mixer, including that for effecting discharge of the mixed batches, the combination of cyclically operable mechanism for measuring determined mixing periods for the batches; mechanism comprising a housing and a cyclically operable cam-shaft therein for automatically controlling the functioning of said mixer instrumentalities and initiating cycles of said measuring mechanism, all in timed sequence; means for independently moving said mechanisms through their operative cycles; means including a manually operable lever mounted adjacent said housing for controlling functioning of said discharge instrumentality independently of said automatic control mechanism; a rod slidably mounted in said housing and provided with an abutment; a lever in said housing operable by said cam-shaft at the beginning of a mixing period to project the rod from the housing into the path of said manual control lever to prevent actuation thereof; a retracting spring connected to the rod; a U-shaped detent straddling the rod for engagement with its abutment to hold the rod in projected position, said detent having a beveled portion engageable by the abutment to effect slight retraction of the rod preliminary to complete release thereof from the detent; and a cam operable by the measuring mechanism to engage the detent at the conclusion of the mixing period and release it from the rod.

WILLIAM H. BUELOW.

REFERENCES CITED

The following references are of record in the file of this patent:

UNITED STATES PATENTS

| Number | Name | Date |
| --- | --- | --- |
| 1,608,831 | Ball | Nov. 30, 1926 |
| 1,962,960 | Lichtenberg | June 12, 1934 |
| 2,004,234 | Blood | June 11, 1935 |
| 2,158,942 | Lundlye | May 16, 1939 |
| 2,232,404 | Pratt | Feb. 18, 1941 |